(12) United States Patent
Kreppold et al.

(10) Patent No.: US 8,371,610 B2
(45) Date of Patent: Feb. 12, 2013

(54) RETAINING MEANS FOR AN AIRBAG ARRANGEMENT AND AIRBAG ARRANGEMENT

(75) Inventors: Michael Kreppold, Schweitenkirchen (DE); Calvin Bristow, Simpsonville, SC (US); Tobias Putz, Meine (DE)

(73) Assignee: Faurecia Innenraum Systeme GmbH (DE)

( * ) Notice: Subject to any disclaimer, the term of this patent is extended or adjusted under 35 U.S.C. 154(b) by 136 days.

(21) Appl. No.: 12/918,855

(22) PCT Filed: Mar. 2, 2009
(Under 37 CFR 1.47)

(86) PCT No.: PCT/EP2009/001608
§ 371 (c)(1),
(2), (4) Date: Mar. 28, 2011

(87) PCT Pub. No.: WO2009/106370
PCT Pub. Date: Sep. 3, 2009

(65) Prior Publication Data
US 2012/0068440 A1    Mar. 22, 2012

(30) Foreign Application Priority Data
Feb. 29, 2008    (EP) .................................... 08075161

(51) Int. Cl.
*B60R 21/20*    (2011.01)
(52) U.S. Cl. .................. 280/728.3; 280/730.1; 280/732
(58) Field of Classification Search ............... 280/728.1, 280/728.2, 728.3, 730.1, 732
See application file for complete search history.

(56) References Cited

U.S. PATENT DOCUMENTS

| | | | | |
|---|---|---|---|---|
| 5,531,471 A | * | 7/1996 | Terai | 280/732 |
| 5,765,862 A | * | 6/1998 | Bentley | 280/728.3 |
| 6,250,669 B1 | * | 6/2001 | Ohmiya | 280/732 |
| 6,464,255 B1 | | 10/2002 | Preisler et al. | |
| 7,222,876 B2 | | 5/2007 | Riesinger et al. | |
| 7,500,693 B2 | * | 3/2009 | Guth et al. | 280/728.3 |

(Continued)

FOREIGN PATENT DOCUMENTS

| | | |
|---|---|---|
| DE | 43 15 853 A1 | 11/1994 |
| DE | 195 30 346 A1 | 2/1996 |

(Continued)

OTHER PUBLICATIONS

"International Application No. PCT/EP2009/001608, International Search Report and Written Opinion dated Apr. 2, 2009", 14 pgs.

(Continued)

*Primary Examiner* — Toan To
(74) *Attorney, Agent, or Firm* — Schwegman Lundberg & Woessner, P.A.

(57) ABSTRACT

A retention device for an airbag arrangement can include a first retaining element, which can be connected via a first end section to an airbag flap and via a second end section to a firing channel or via a first end section to at least one airbag flap and via a second end section to a carrier which encloses the airbag flap and has at least one section disposed between the first and the second end sections. The first end section and/or the second end section have at least two overlapping end subsections, which are connected to one another and which are connected opposite to one another and spaced apart from one another to the first plate and second plate, respectively.

18 Claims, 9 Drawing Sheets

U.S. PATENT DOCUMENTS

Figure 1A:
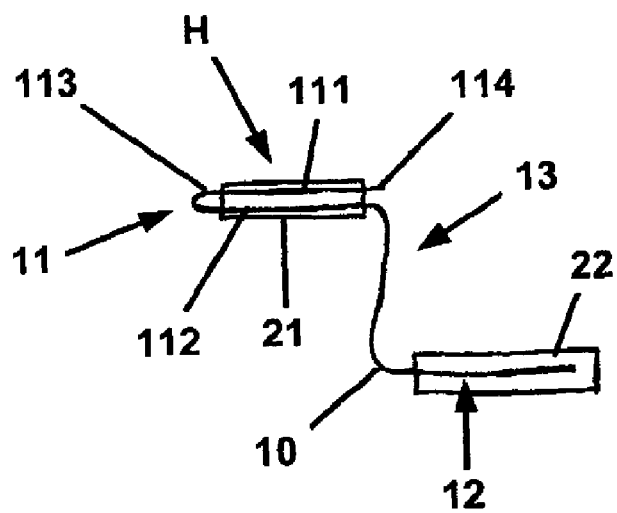
Figure 1A:
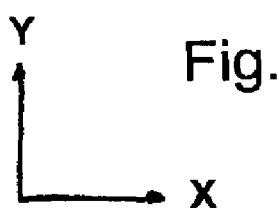

| | | | |
|---|---|---|---|
| 7,878,528 B2* | 2/2011 | Dorn | 280/728.3 |
| 8,181,986 B2* | 5/2012 | Schlemmer | 280/728.3 |
| 2001/0045734 A1* | 11/2001 | Damman et al. | 280/736 |
| 2006/0197322 A1* | 9/2006 | Riester et al. | 280/730.2 |
| 2006/0208468 A1* | 9/2006 | Riester et al. | 280/730.2 |
| 2009/0026740 A1* | 1/2009 | Dorn | 280/728.3 |

FOREIGN PATENT DOCUMENTS

| | | |
|---|---|---|
| DE | 197 35 438 A1 | 2/1999 |
| DE | 198 28 975 A1 | 12/1999 |
| DE | 101 35 614 A1 | 2/2003 |
| DE | 10 2006 035208 A1 | 1/2008 |
| FR | 2 902 728 | 12/2007 |

OTHER PUBLICATIONS

"International Application No. PCT/EP2009/001608, Translation of International Preliminary Report on Patentability mailed Oct. 7, 2010", 7 pgs.

* cited by examiner

RETAINING MEANS FOR AN AIRBAG ARRANGEMENT AND AIRBAG ARRANGEMENT

PRIORITY CLAIM TO RELATED APPLICATIONS

This application is a national stage application under 35 U.S.C. §371 of PCT/EP2009/001608, filed Mar. 2, 2009, and published as WO 2009/106370 A1 on Sep. 3, 2009, which claims priority to European Application No. 08075161.3, filed Feb. 29, 2008, which applications and publication are incorporated herein by reference and made a part hereof in their entirety, and the benefit of priority of each of which is claimed herein.

The subject of the present invention is a retaining means for an airbag arrangement according to the preamble of claim 1 and also an airbag having a retaining means.

Normally, airbag arrangements have an airbag flap which is disposed on a support and has a firing channel situated thereunder, an airbag being located in the firing channel. When triggered, the latter unfolds firstly in the direction prescribed for it by the firing channel and presses on the airbag flap, the airbag being opened and the airbag being able to unfold into the vehicle interior.

When the airbag flap opens, so-called retaining means frequently assume a hinge function of the airbag flap. These retaining means are mounted on the side of the airbag flap orientated away from the vehicle interior and on the support or in the firing channel. Mostly, the retaining means extend such that they form a hinge which extends parallel to the tearing edge of the airbag flap. The tearing edge is hereby that edge where the airbag could at least purely theoretically pass through first.

The retaining means often have an excess length, this means that these should form not only a connection of a minimum length between the airbag flap and the support or firing channel but rather, because of the thickness of the support or of the airbag flap, require an excess length so that the airbag flap can be completely opened at least on three sides for passage of the airbag. The fourth side is hereby that side along which the retaining means extends.

When the airbag flap opens, great tensile forces act on the above-mentioned retaining means. For this reason, the retaining means must be mounted, with great complexity, on the airbag flap or the support or in the firing channel so that they cannot become detached from the latter. Should the connection between the retaining means and the airbag flap or the support or the firing channel not be sufficiently good, the retaining means could be detached which leads to uncontrolled opening of the airbag flap, as a result of which for example the airbag flap is hurled into the vehicle interior or correct unfolding of the airbag is prevented. The two previously mentioned scenarios should for this reason be avoided in all circumstances.

In DE 101 35 614 A1, an airbag arrangement with retaining means is shown, the retaining means being glued or welded on the support or on the airbag flap. In addition, domes on which the retaining means can be secured in the manner of a screw are present. A similar attachment of the retaining means is known from DE 195 30 346 A1, the retaining means being embedded in the airbag flap and being embedded on the support in securing tabs, the securing tabs being screwed down to the support. Both arrangements have in common that the retaining means are connected merely once to the airbag flap or to the support or to the firing channel. As a result, it becomes possible with high tensile forces due to the opening of the airbag flap that the retaining means detaches since it has no "means of restraint".

This document describes, among other things, how to produce a retaining means for an airbag arrangement or to produce an airbag arrangement having a retaining means which does not have the above-mentioned disadvantage.

This can be achieved by a retaining means for an airbag arrangement according to the features of claim 1 and also an airbag arrangement according to the coordinated claims. Advantageous developments of the invention are disclosed in the subordinate claims.

The retaining means for an airbag arrangement has a first retaining element having a first and a second end portion, a further portion being disposed between the first and second end portion. The first end portion can be connected to an airbag flap, the second end portion to a firing channel or to a support surrounding the airbag flap. The second end portion can also be mountable or mounted on a different stationary object disposed in the region of the firing channel or of the support. These objects are included expressly under the terms support and firing channel.

A first plate which can be connected to an airbag flap is disposed on the first end portion. The same applies for the second end portion which is connected to a second plate, the plate being able to be disposed in the firing channel or on the support. It must hereby be ensured that merely one of the two first or second plates requires to be present, however also both can be present.

The invention is further characterised in addition in that the first end portion has at least two overlapping end partial portions connected to each other, the end partial portions being situated opposite each other and being at a spacing from each other by means of the first plate. Furthermore, they are connected to the first plate. The same possibility is offered for the second end portion and its connection to the second plate.

Due to the "U"-shaped or "J"-shaped winding around of the first and/or second plate, the first retaining element, with one or both of its end portions, engages with the first and/or second plate from behind, as a result of which additional safeguarding against withdrawal of the first retaining element from the first or second plate is avoided. The first and the second end portion are consequently no longer mounted only on one side of the plate but are preferably placed around the first or second plate in the form of a loop so that with tension—for example due to triggering of the airbag—the retaining means is retained in addition on the first plate due to the turning point of the loop. As a result, it becomes possible to design the retaining means for higher tensile forces. Furthermore, because of the presence of the first and/or second plate, it is possible to retrofit the retaining means subsequently to an airbag arrangement, the design of which has already been completed.

In one embodiment of the retaining means, the end partial portions of the first end portion are connected to the first plate and/or the end partial portions of the second end portion to the second plate at least partially in an integral manner. As a result, the connection between the first or second plate and the first or second end partial portion is reinforced in addition, as a result of which in turn higher tensile forces can be absorbed.

In a further embodiment, the end partial portions of the first end portion are recessed at least partially into the first plate and/or the end partial portions of the second end portion into the second plate. This can take place for example by means of rear-spraying or spraying-in of the end portions during production of the first or second plate. As a result, a particularly good connection with high tensile strength is produced between the end portion and the plate.

In a further embodiment, the at least two overlapping end partial regions of the first end portion are formed in a loop with a turning point (turning point in the sense of a connection point of the two legs of a "U" or "J"), the turning point not being connected to the first plate. Analogously, the same applies to the overlapping end partial regions of the second end portion. As a result of the fact that the partial portion with the turning point is not connected to the first or second plate, the turning point is visible from outside and visual quality control can be undertaken in order to check whether the end portion extends beyond the entire length of the plate. The visible arrangement of the turning point ensures that the plates need not be cut up as a sample for quality control purposes. It is thereby particularly preferred if the first end portion is glued or welded or screwed or sprayed in to the first plate and/or the second end portion to the second plate.

Preferably, the first retaining element has a woven material or a film made of polyester and/or fibre-reinforced polyester and/or an aramide. Polyamide can also be used. In particular via the use of aramide or an aramide-reinforced polyester, particularly high tensile strength can be achieved and, in conjunction with the "U"- or "J"-shaped arrangements of the end partial portions of the first and second plate, improved resistance to tearing out of the retaining means.

Furthermore, it is advantageous if the first and/or second plate consists of polypropylene, preferably a fibre-reinforced polypropylene, such as for example PPLGF20 or has this.

In one embodiment of the first retaining element, the end partial portions of the first and/or second end portion are between 0.5 and 15 cm, preferably between 1.5 and 5 cm long. The lengths of the first and second end portion are produced herefrom by doubling. The length of the portion lying between the first and second end portion is between 2 and 20 cm, preferably 4 to 15 cm.

1. In one embodiment of the retaining means, the portion has at least two overlapping partial portions, at least one second retaining element producing a connection between the at least two partial portions. The second retaining element thereby has a lower tensile strength than the first retaining element. As a result of the fact that the at least two partial portions are connected to each other, the original excess length defined by the total length of the portion is shortened. The connection between the at least two partial portions is thereby advantageously produced such that the portion situated between the first and second end portion is effectively reduced to a length which corresponds essentially to the direct connection between the second end portion of the retaining means mounted on a support or in the firing channel and the first end portion mounted on an airbag flap. Also this effective initial excess length which represents the length of the portion from the first end portion up to the connection and from the second end portion up to the connection together can be marginally longer than the direct connection. The direct connection is hereby formed by a straight line. The feature that the first end portion has at least two overlapping end partial portions which are connected to each other and are connected to the first plate, situated opposite each other and at a spacing from each other, and/or the second end portion has at least two overlapping end partial portions which are connected to each other and are connected to the second plate, situated opposite each other and at a spacing from each other, is, in the embodiment of the retaining means of the preceding section, merely a preferred option, but not wholly necessary, and forms an independent invention.

The retaining means then restricts a thrust load acting on an axis of the airbag flap in operational connection with the retaining means, the thrust load on an oppositely situated axis of the airbag flap essentially parallel to this axis remaining unchanged, which leads to direct initiation of the rotational movement of the airbag flap. After initiation of the rotational movement of the airbag flap, the excess length defined by the portion disposed between the first and second end portion is required, in its total length, to enable complete opening of the airbag flap. Since the second retaining element, with which the connection between the at least two partial portions is produced, has a lower tensile strength than the first retaining element, the connection prevailing between the at least two partial portions tears because of the compression pressure of the airbag, as a result of which the entire excess length defined by the portion is available. The excess length is however only available after the rotational movement of the airbag flap has already been initiated.

The advantage of the retaining means according to the invention is that firstly the rotation of the airbag flap is initiated and only subsequently is the excess length which is required because of the thickness of the support or the instrument panel or the airbag flap available because of tearing of the connection. Hence, a thrust load is virtually avoided.

In a further embodiment of the invention, the connection between the at least two partial portions is produced by glueing, welding or sewing. In the above-mentioned connection possibilities, the two partial portions can be connected to each other such that only after a predefined tension is applied on the connection is this connection detached and the entire excess length is made available. The tension required to tear the connection is preferably 800 to 2,000 N, particularly preferably 1,000 to 1,500 N. The tensile strength of the connection is thereby always less than the tensile strength of the first retaining element which is preferably greater than 5,000 N. According to the connection which is used, there are considered as second retaining element for example adhesive for an adhesive connection, plastic materials for a welded connection and yarn or fibres for sewing which are applied in the form of a seam. In particular the use of yarn and fibres in the form of a seam must hereby be emphasised since these can be applied in a particularly simple manner.

In a further embodiment of the retaining means, the portion disposed between the first and the second end portion has three overlapping partial portions, the at least one second retaining element producing a connection between the at least three partial portions. This "S"-shaped arrangement of the portion of the first retaining element represents a topologically particularly simple solution. When using this solution, both two and the three partial portions can be connected to each other. Of course, also more overlapping partial portions can be used. The same applies to the connection by the second retaining element.

The various embodiments of the invention can be combined with each other.

The retaining means according to the invention or embodiments thereof can be used in an airbag arrangement having at least one airbag flap, covering a firing channel, with a visible side orientated towards the vehicle interior. The retaining means hereby forms, along one side of the airbag flap, a hinge for the latter or assumes a hinge function. The first end portion is connected to the at least one airbag flap and the second end portion to the firing channel or to a support surrounding the airbag flap. The advantageousness of such an arrangement was dealt with already in the preceding sections.

As an alternative hereto, the retaining means can also be configured without a first and second plate, the first end portion and the at least two overlapping end partial portions connected to each other being situated opposite each other and being recessed, at a spacing from each other, in the airbag flap. It is likewise possible to recess the at least two overlapping end partial portions of the second end portion, which are connected to each other, situated opposite each other and at a spacing from each other, into the firing channel or the support. As a result, the first and second plate is dispensed with, which in fact increases production costs and makes retrofitting more difficult but results in further improved tensile strength of the retaining means due to the anchoring in the support or in the airbag flap.

Figure 2A:
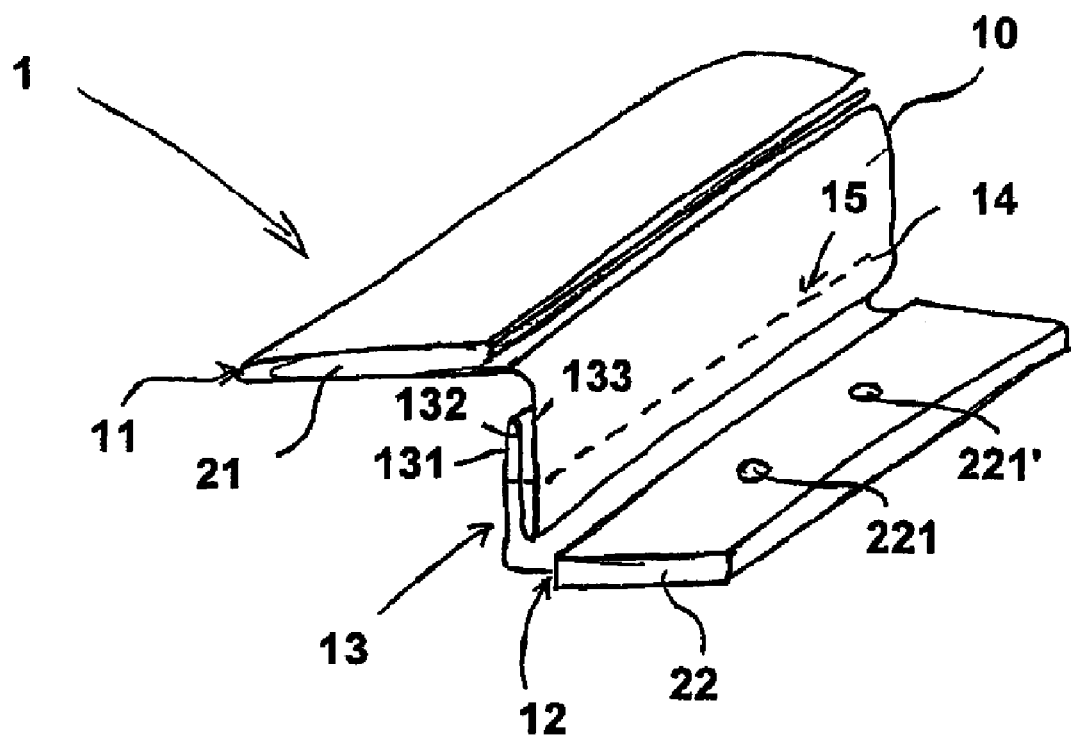
Figure 3A:
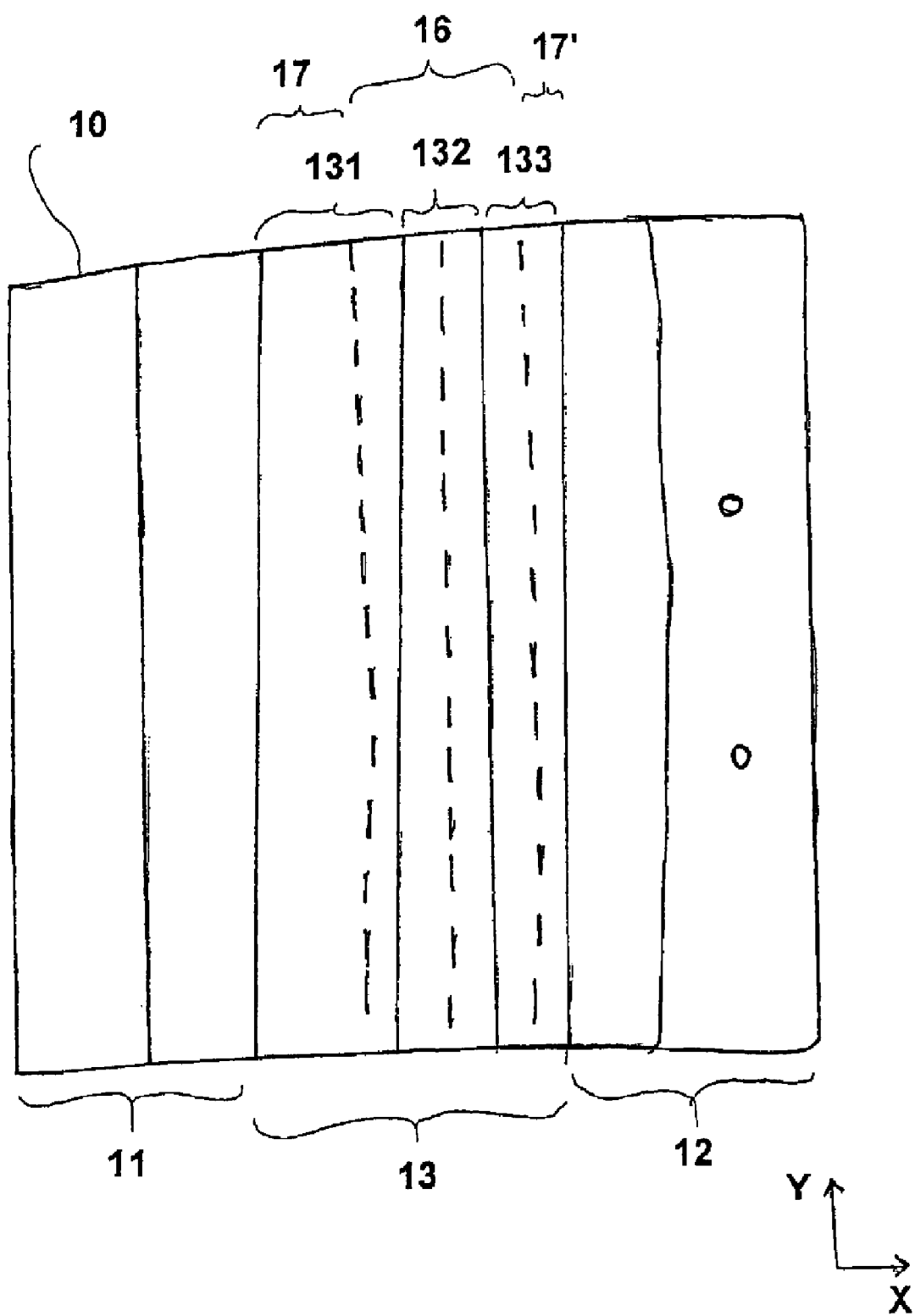
Figure 5:
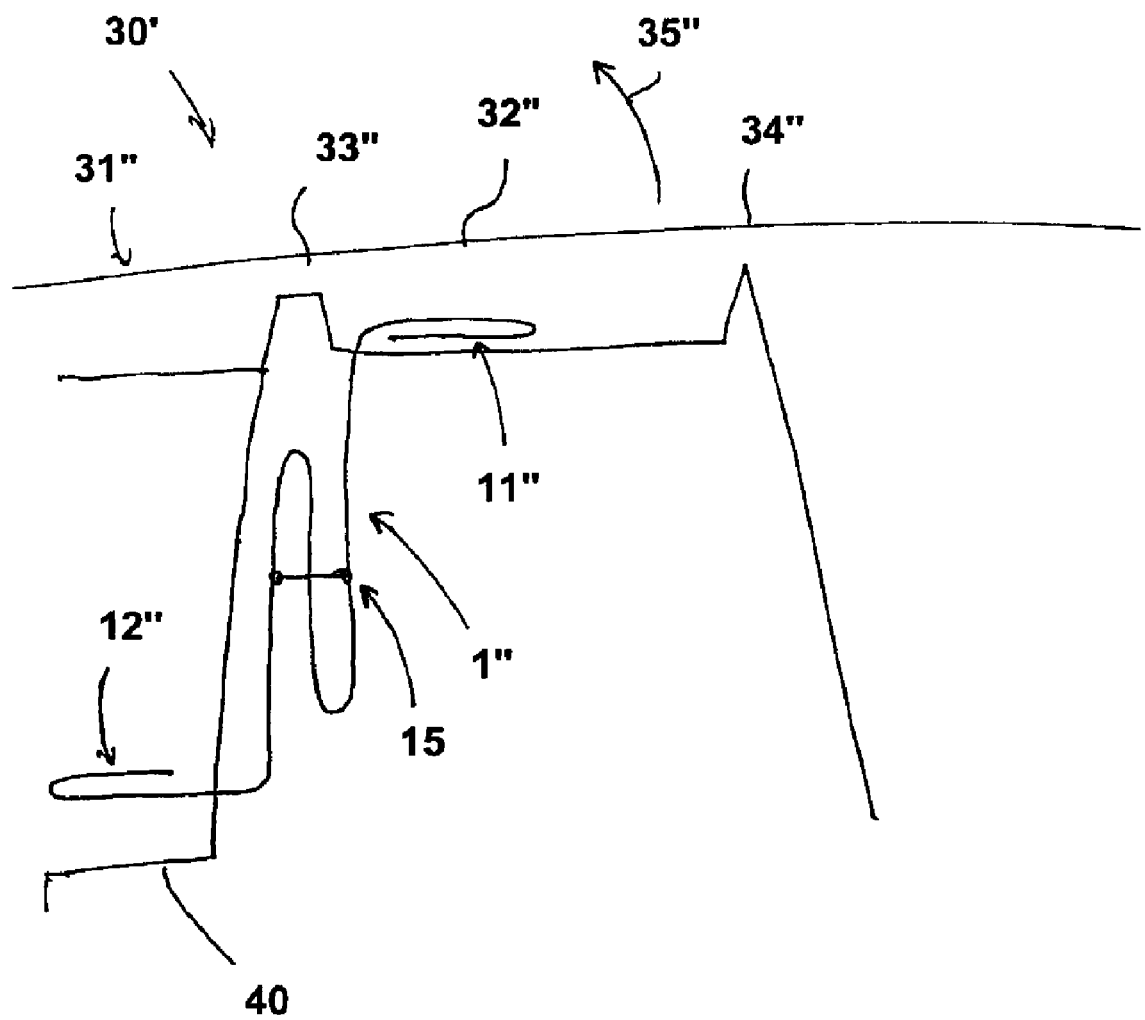

The invention is intended to be explained in more detail subsequently with reference to a few embodiments. There are shown:

FIG. 1*a, b, c* embodiments of a retaining means;

FIG. 2*a, b* a further embodiment of a retaining means with connection;

FIG. 3*a, b* an embodiment of a woven material;

FIG. 4*a-d* the mode of operation of an embodiment of the retaining means in an airbag arrangement;

FIG. 5 an alternative arrangement of the retaining means in an airbag arrangement.

In FIG. 1*a*, a first embodiment of a retaining means according to the invention is represented in cross-section. The retaining means H has a first retaining element in the form of a woven material 10 with a first end portion 11 and a second end portion 12 and also a portion 13 situated therebetween. Furthermore, the retaining means has a first plate 21 and a second plate 22. The first end portion 11 has two end partial portions 111 and 112 with a turning point 113 and is disposed in a "J"- or "U"-shape in the first plate. The arrangement of the first end portion 11 is thereby chosen such that the turning point 113 is situated outwith the first plate 21. The same applies to the end 114 of the first end portion 11 which protrudes on the oppositely-situated side of the first plate 21. As a result of the fact that both the turning point 113 and the end 114 do not extend within the first plate 21, visual quality control of the retaining means H from the outside becomes possible without the first plate 21 or the second plate 22 requiring to be cut during production in a random sampling manner. Furthermore, it need be ensured that the second end portion 12 is in fact disposed merely once within the second plate 22, however it can also be disposed in a "J"-shape or "U"-shape with a turning point.

Figure 1B:
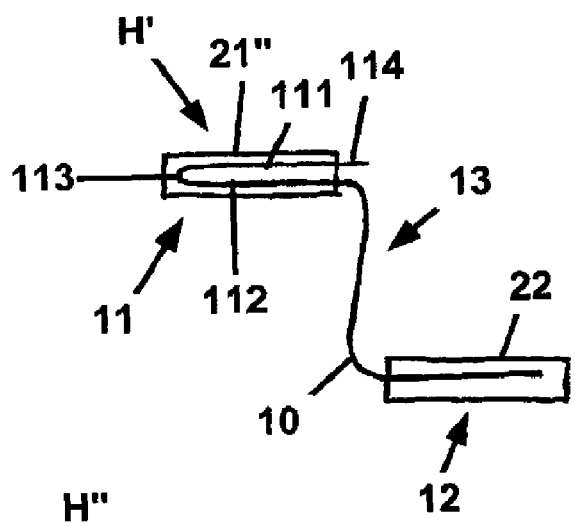
Figure 1B:
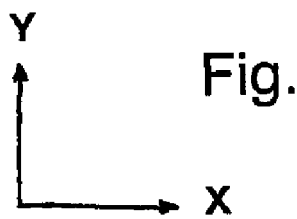

An alternative embodiment of the retaining means is represented In FIG. 1*b*. The retaining means H' likewise has the woven material 10 with the first end portion 11 and the end portion 12 and also the portion 13 situated therebetween, the end partial portions 111 and 112 and also the turning point 113 being situated within the first plate 21". This means that, assuming that the first plate 21" is not transparent, the turning point 113 is not visible to an observer. Merely the end 114 of the first plate 21" shows. This embodiment can be preferred if the woven material 10 is placed in a tool and subsequently is sprayed around, the first plate 21" being produced by the spraying-around.

Figure 1C:
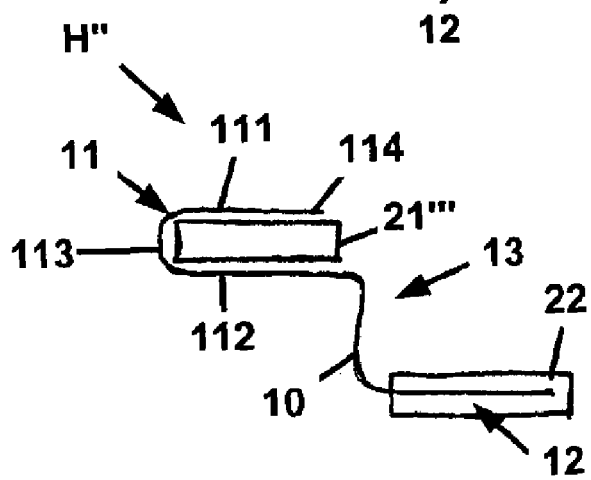
Figure 1C:
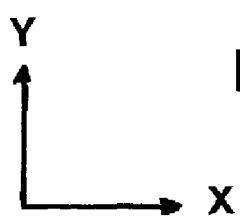

An alternative embodiment of the retaining means is shown in FIG. 1*c*. The retaining means H" is distinguished in that the first end portion 11 is disposed externally on the first plate 21‴ in a "J"-shape or "U"-shape. This means that the end partial portions 111 and 112 are at a spacing from each other by the entire thickness in the y-direction of the plate 21‴ and are oppositely-situated. In the previous embodiments of FIGS. 1*a* and 1*b*, the end partial portions 111 and 112 are likewise at a spacing from each other, however not beyond the entire thickness of the first plate. Furthermore, it is represented in FIG. 1*c* that the turning point is disposed on the left side of the first plate 21‴, viewed in x-direction. In contrast to the previous FIGS. 1*a* and 1*b*, the first end portion 11 is not sprayed onto the first plate 21‴ but is merely glued to it.

In FIG. 2*a*, an embodiment of a retaining means with a connection is described in more detail. The retaining means 1 has a first retaining element in the form of the woven material 10 which has a first end portion 11 and a second end portion 12. In addition, it has a portion 13 disposed between the first and the second end portion, the portion 13 having three overlapping partial portions 131, 132, 133. The three overlapping partial portions are connected to each other by a second retaining element 14. The connection 15 is indicated.

The first end portion 11 is disposed around a first plate 21 in a "U"- or "J"-shape, the first plate 21 and hence the first end portion 11, connected thereto, of the first retaining element of the retaining means 1 being able to be connected to an airbag flap. The second end portion 12 is situated in a second plate 22, the second plate 22 having two borings 221, 221' via which it can be mounted in the firing channel or on the support of an airbag arrangement.

The illustrated woven material 10 consists of a mixture of polyester- and aramide fibres. The first plate 21 and the second plate 22 consist of a fibre-reinforced polypropylene, the reinforcing fibres of the polypropylene being glass fibres. As an alternative to the polyester, also polyamide or polypropylene can be used.

The second retaining element 14 in FIG. 2*a* is a thread which is drawn respectively through the three partial portions 131, 132, 133 and thus sews these together, the seam forming the connection 15. The second retaining element used here has a tensile strength which is very much lower than the tensile strength of the woven material 10. This leads to the fact that, at the initial moment at which an airbag presses against an airbag flap, the tensile strength of the second retaining element 14 is in fact great enough not to tear but, after the rotation of the airbag flap is initiated, the tension becomes too great and the second retaining element tears, as a result of which the connection 15 is detached and the portion 13 is available with its entire length.

Figure 2B:
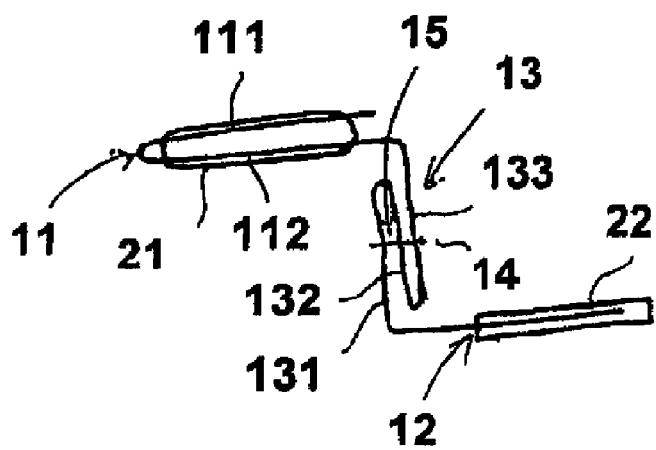

In FIG. 2*b*, the retaining means 1 of FIG. 2*a* is represented once again in a different perspective. The section I through FIG. 2*a*, shown here, reveals that the first end portion 11 of the first retaining element of the retaining means 1 has two end partial portions 111, 112 which form respectively the legs of the "J" or "U". The two legs are thereby sprayed into the first plate 21 in part, but at a spacing from each other. Merely in the x-direction outwith the first plate 21 are ends situated which are not sprayed into the plate. These ends serve for the purpose of being able to test easily during production of the retaining means whether the first end portion 11 actually also passes through the total length of the first plate 21, viewed in x-direction. Alternatively thereto, the loop lying to the left of the plate 21 can be situated in the plate 21.

Furthermore, it can be seen that the second end portion 12 is situated within the second plate 22 in part. It is likewise sprayed into the latter. Via the screws to be introduced later into the borings 221, 221', the second end portion 12 situated in the second plate 22 is likewise penetrated so that this is also retained in a stable manner in the second plate 22.

In FIG. 3*a*, the first retaining element is represented in more detail in the form of the woven material 10 of the retaining means 1. Of course, the first retaining element can also be a film or another flat material. It should be mentioned at this point that the woven material 10 per se already forms a retaining means. The first end portion 11 is thereby mounted directly on an airbag flap, the second end portion 12 is mounted directly on the support or in the firing channel and the second retaining element 14 is applied in the portion 13 in such a manner that the connection 15 is produced.

The woven material 10 has a length in the y-direction which corresponds essentially to the width of an airbag flap. However, it is also conceivable to fit a plurality of woven materials 10 or retaining means 1, although narrower, distributed over the width of the airbag cover. The length in x-direction is thereby chosen such that the portion 13 is in the range between 5 and 20 cm, particularly preferably between 6 and 14 cm. The width in y-direction is preferably between 20 and 80 cm, particularly preferably between 25 and 40 cm. The woven material 10 is represented in the unfolded state, i.e. the location of the connection 15 is merely indicated, but separated. The shortening of the excess length of the portion 13, achieved by means of the connection 15, is indicated by the shortened region 16. This means that the effective initial excess length, i.e. when the airbag is triggered, before the latter impinges on the airbag flap, is essentially the sum of the portions 17 and 17'. This is lengthened after detachment of the connection 15 to form the excess length of the total portion 13.

It should be mentioned in addition with reference to FIGS. 2a, 2b and 3a why three overlapping partial portions 131, 132, 133 are advantageous. Such an overlap has the consequence that the connection 15 can be applied essentially at each position of the partial portions and, in every case, provided that the connection 15 connects all three partial portions to each other, a successful effective shortening of the portion 13 to the sum of the portions 17 and 17' can be undertaken. Slight displacement of the connection 15 in the x-direction does not change the shortened region. For this reason, this remains the same and is merely dependent upon the type of arrangement of the overlapping partial regions.

Figure 3B:
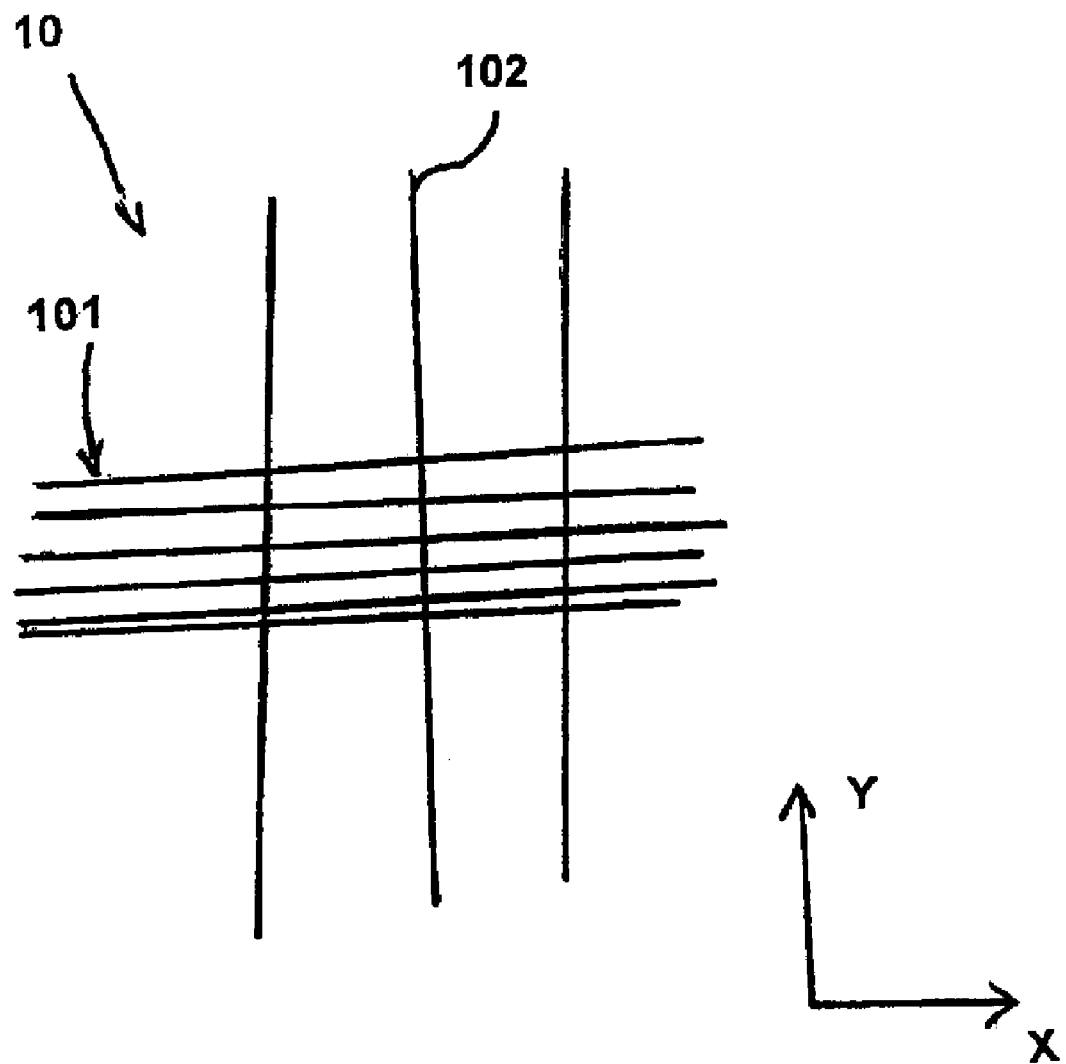

In FIG. 3b, the interior of the woven material 10 is represented, aramide fibres 101 extending in the x-direction which have a higher density than the fibres 102 which extend in the y-direction. This increases in particular the tensile strength in the x-direction which, during installation of the retaining means 1 or the woven material 10 into an airbag arrangement, is the crucial tensile direction for the retaining means.

With reference to FIGS. 4a-d, the mode of operation and arrangement of the retaining means in an airbag arrangement is intended to be explained. The airbag arrangement 30 has a support 31 and two airbag flaps 32, 32', the airbag flaps 32, 32' being connected to the support 31 via weakened connection points 33 or 33'. The weakened connection points 33, 33' can thereby have a hinge effect, however they can also burst open when an airbag is triggered so that no connection—apart from the retaining means 1, 1'—exists any longer between the support 31 and the airbag flaps 32, 32'. A weakness can be detected between the airbag flaps 32, 32', by means of which the tearing edge 34 is formed. In the y-direction below the airbag flaps 32, 32', the firing channel 40 with the airbag 41 situated therein is situated. When the airbag 41 is triggered, the latter is pressed in the direction 42, which leads to the fact that said airbag presses on the airbag flaps 32, 32' and effects a rotation of the same in the directions 35, 35'.

Both the airbag flap 32 and the airbag flap 32' are connected to a retaining means 1 or 1'. The retaining means 1 is disposed in the firing channel 40, it being securely connected to the latter via a screw 223 inserted through the boring 221. The retaining means 1' is sprayed into the support 31.

The retaining means 1 has a connection 15 which connects three overlapping portions to each other. It becomes clear from this view that the connection 15 is displaceable in the y-direction without changing the effective initial excess length of the retaining means 1. The retaining means 1' merely has two overlapping partial portions 131', 132', the connection 15' being disposed such that it effects maximum shortening. During a displacement of the connection 15' downwards in the y-direction, the degree of shortening becomes less so that, in the case of merely two oppositely-situated partial portions, it also depends upon the position of the connection 15'. The connection 15 is produced, as shown in FIGS. 2a, 2b, by means of a yarn or a fibre and forms a seam. The connection 15' is formed by a second retaining element 14', the second retaining element 14' being an adhesive.

Figure 4A:
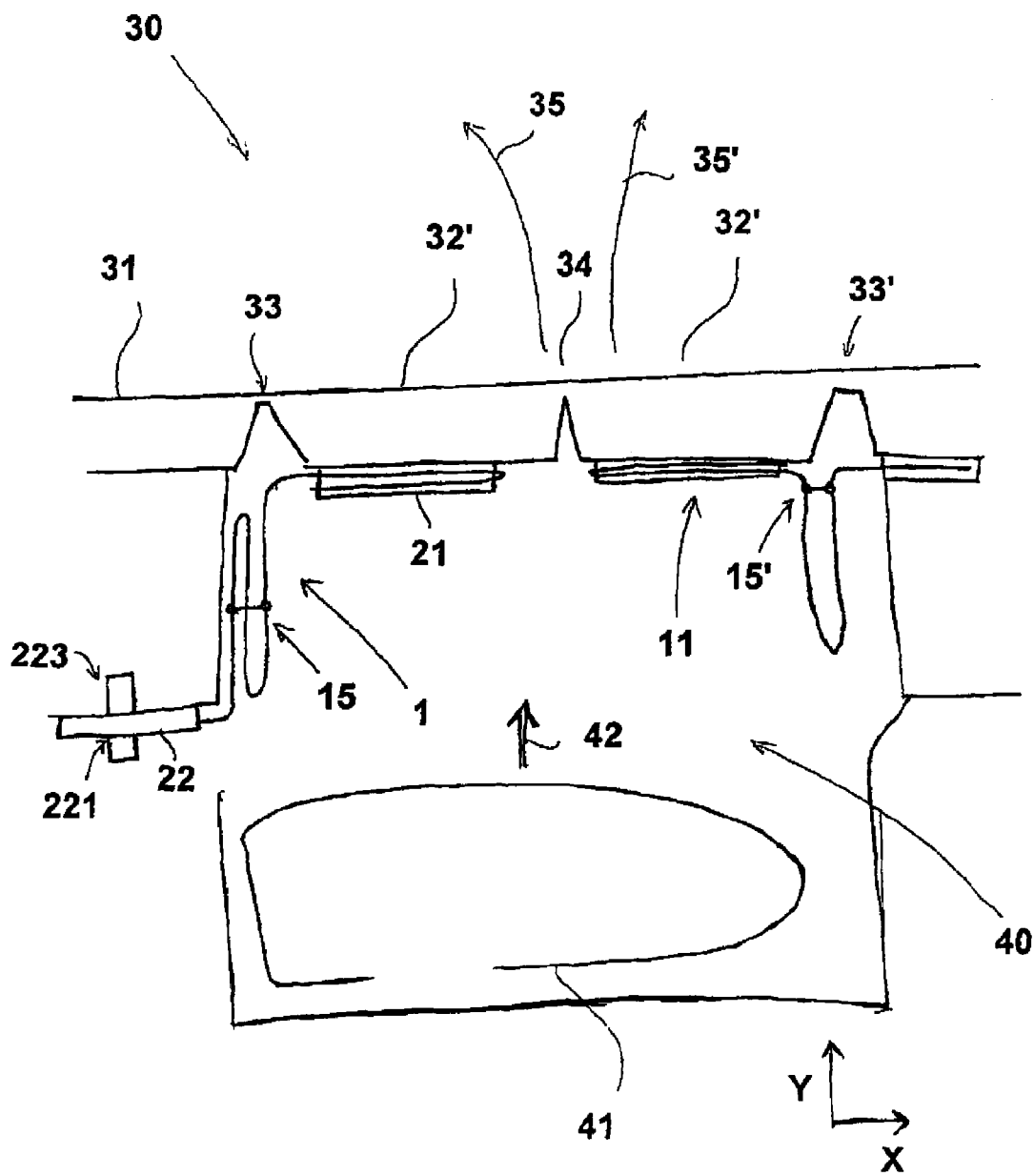
Figure 4B:
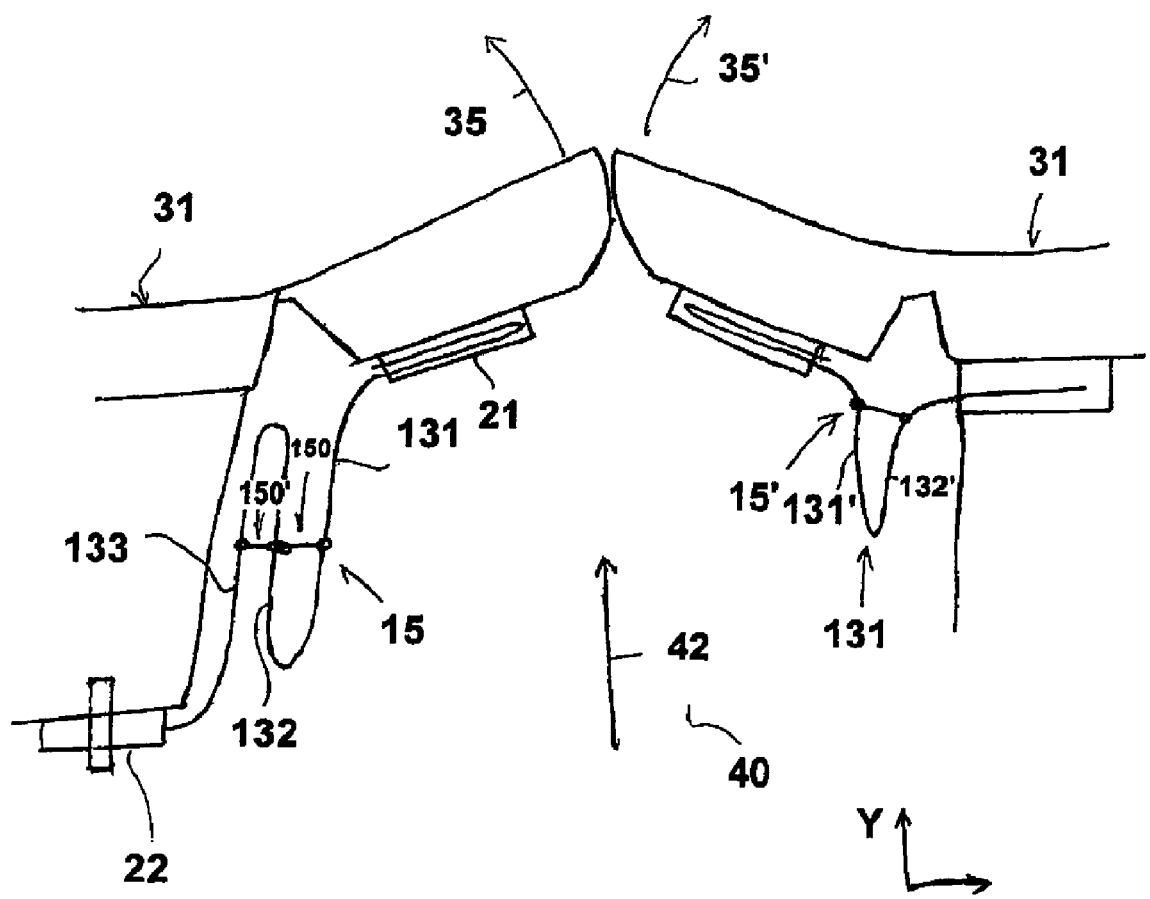

In FIG. 4a, the airbag arrangement 30 is closed. When the airbag 41 is triggered, the latter presses upwards in the direction 42. Upon impinging on the side of the airbag flaps 32 or 32', orientated away from the visible side, said airbag presses firstly uniformly on the airbag flaps. Since however the retaining means 1 or 1' are situated in the connection regions 33 or 33' and they offer resistance to a thrust of the airbag flaps 32 or 32', the result is initial rotation of the airbag flaps 32 or 32' in the directions 35 or 35'. This leads to the fact, as shown in FIG. 4b, that the tearing edge 34 tears. The tearing edge 34 hereby extends in the z-direction. At the time of tearing of the tearing edge 34, the illustrated connections 15 or 15' are still intact.

Figure 4C:
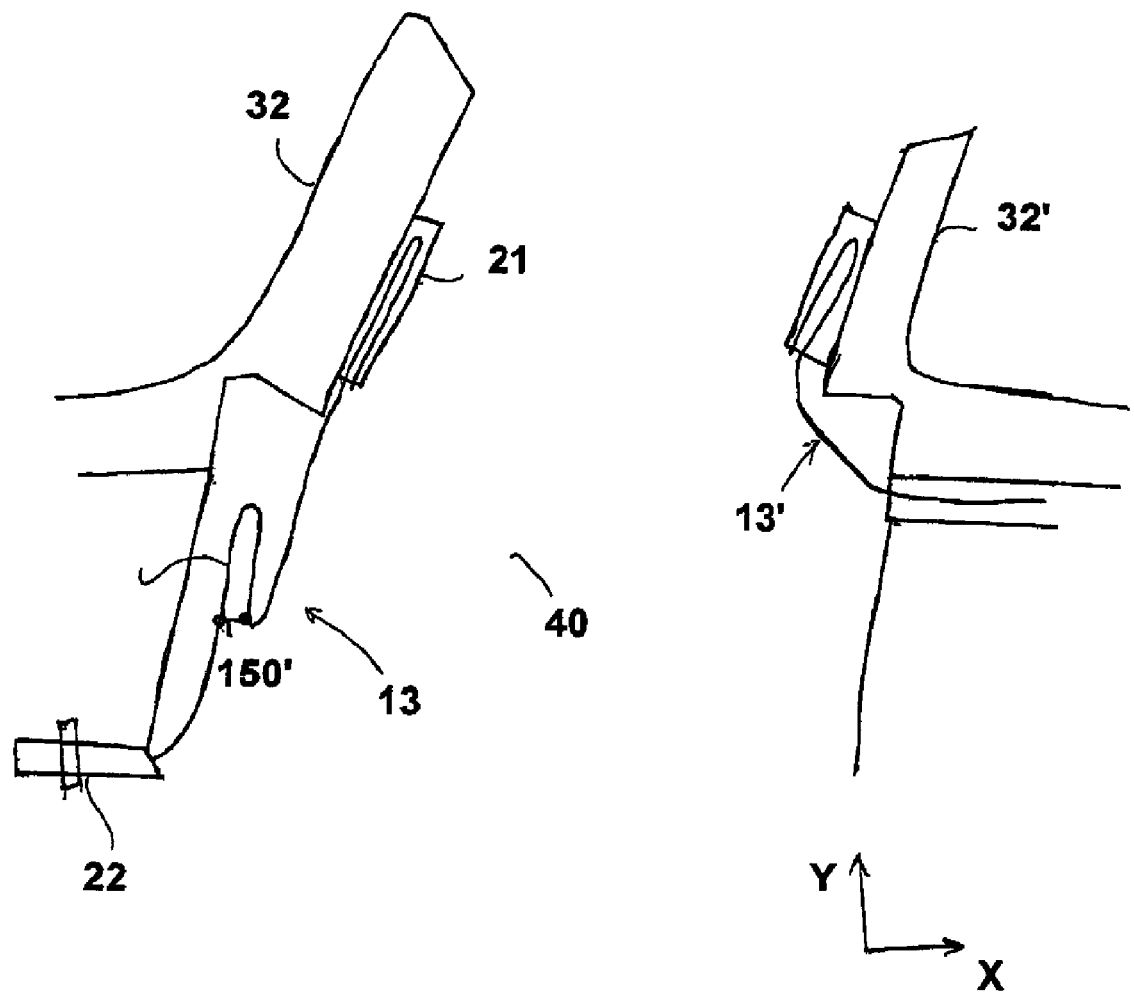
Figure 4D:
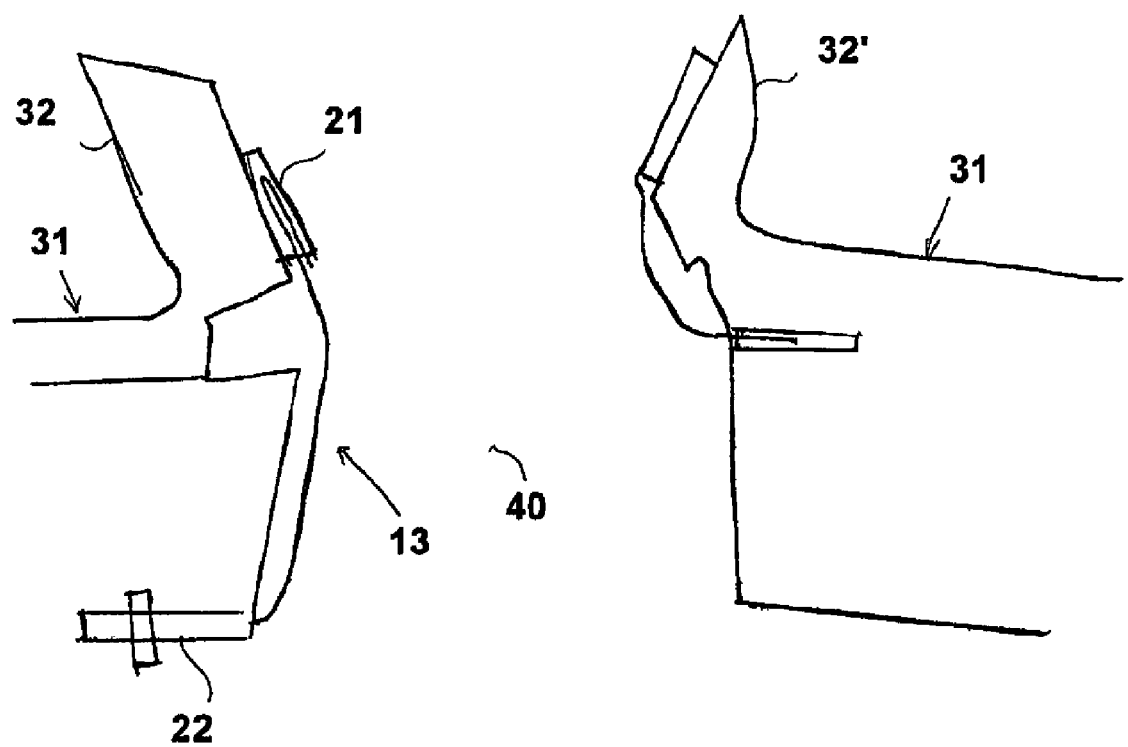

Upon further pressing of the airbag, the connections 15 or 15' detach and now enable further pivoting upwards of the airbag flaps 32 or 32'. The connection 15 can then thereby be constructed, as illustrated, from two sub-connections 150, 150' so that firstly the connection 150 between two overlapping partial regions tears. This is represented in FIG. 4c. At a later time, the second partial connection 150' then tears, as represented in FIG. 4d. However, it is of course also possible that the connection 15 is configured as a continuous connection 15 connecting all three partial regions, this connection tearing and releasing all three partial regions.

The retaining means shown here all fulfil at the same time a hinge function. However, it is also conceivable to configure the retaining means with "V"-shaped woven materials 10, these being disposed along the side edges, i.e. edges of the airbag flaps extending in the x-direction in FIGS. 4a to 4d, the connection 15 then having a gradual increase in tensile strength from increasing to reducing x-direction so that firstly the left region of the airbag flap 32 would tear since the resistance here is lowest.

In FIG. 5, an alternative embodiment of the retaining means is illustrated. An airbag arrangement 30' with an airbag flap 32" and also a support 31" is shown, the airbag flap 32" being connected to the support via the connection point 33". Furthermore, a tearing edge 34" can be seen, along which the airbag flap opens and subsequently rotates in the direction 35". The illustrated retaining means 1" has a first end portion 11" and a second end portion 12", these having respectively two end partial portions which are situated opposite each other at a spacing from each other in a "U"-shape. The first end portion 11" is thereby situated in the airbag flap 32" and the second end portion 12" in the border of the firing channel 40. As a result of the arrangement of the retaining means 1" shown in FIG. 5, a first and second plate can be dispensed with. Because of the "U"-shaped or "J"-shaped covering of the first or second end portion 11", 12", the tensile strength between the retaining means 1" and the airbag flap 32" or the firing channel 40 is improved so that the retaining means 1" cannot be withdrawn from the latter.

What is claimed is:

1. An apparatus comprising:
a retaining device means for an airbag arrangement, the retaining device comprising:
a first retaining element configured to be connected via a first end portion to at least one airbag flap and, via a second end portion, to a firing channel or, via the first end portion, to at least one airbag flap and, via the second end portion, to a support surrounding the airbag flap; and
wherein the first retaining element has at least one portion disposed between the first and the second end portion, and, on the first end portion, a first plate, which is configured to be connected to an airbag flap and/or on the second end portion, a second plate, which is configured to be connected to a support or a firing channel is mounted and
wherein the first end portion has at least two overlapping end partial portions which are connected to each other and are connected to the first plate, situated opposite each other and at a spacing from each other, and/or the second end portion has at least two overlapping end partial portions which are connected to each other and are connected to the second plate, situated opposite each other and at a spacing from each other.

2. The apparatus according to claim 1, wherein the end partial portions of the first end portion are connected to the first plate and/or the end partial portions of the second end portion are connected to the second plate at least partially in an integral manner.

3. The apparatus according to claim 1, wherein the end partial portions of the first end portion are recessed at least partially into the first plate and/or the end partial portions of the second end portion are recessed at least partially into the second plate.

4. The apparatus according to claim 1, wherein the at least two overlapping end partial portions of the first end portion form a simple loop with a turning point, the turning point being unconnected to the first plate, and/or the at least two overlapping end partial portions of the second end portion forming a single loop with a turning point, the turning point being unconnected to the second plate.

5. The apparatus according to claim 1, wherein the first end portion is at least one of glued or welded or screwed or sprayed in to the first plate and/or the second end portion is at least one of glued or welded or screwed or sprayed in to the second plate.

6. The apparatus according to claim 1, wherein the first retaining element has a woven material or a film made of polyester and/or fibre-reinforced polyester and/or aramide.

7. The apparatus according to claim 1, wherein the first and/or second plate has polypropylene.

8. The apparatus according to claim 1, wherein the end partial portions of the first and/or of the second end portion respectively have a length between 0.5 cm to 15 cm.

9. The apparatus according to claim 1, wherein the end portion has at least two overlapping partial portions and comprising at least one second retaining element produces a connection between the at least two partial portions, and wherein the second retaining element has a lower tensile strength than the first retaining element.

10. The apparatus according to claim 9, wherein the connection includes at least one of a glued, welded, or sewn connection.

11. The apparatus according to claim 1, further comprising an airbag arrangement having at least one airbag flap covering a firing channel, having a visible side orientated towards a vehicle interior, the first end portion being connected like a hinge to the at least one airbag flap and the second end portion being connected to the firing channel or to a support surrounding the airbag flap along one side of the at least one airbag flap.

12. The apparatus according to claim 7, wherein the first and/or second plate has fibre-reinforced polypropylene.

13. The apparatus according to claim 8, wherein the end partial portions of the first and/or of the second end portion respectively have a length between 1.5 cm and 5 cm.

14. The apparatus according to claim 10, wherein the connection comprises a glued connection.

15. The apparatus according to claim 10, wherein the connection comprises a sewn connection.

16. The apparatus according to claim 10, wherein the connection comprises a welded connection.

17. An apparatus comprising:
a retaining device for an airbag arrangement, the retaining device comprising:
a first retaining element configured to be connected via a first end portion to at least one airbag flap and, via a second end portion, to a firing channel or, via the first end portion, to at least one airbag flap and, via the second end portion, to a support surrounding the airbag flap; and
wherein the first retaining element includes a woven material and has at least one portion disposed between the first and the second end portion, and, on the first end portion, a first plate, which is configured to be connected to an airbag flap and/or on the second end portion, a second plate, which is configured to be connected to a support or a firing channel is mounted; and
wherein the first end portion has at least two overlapping end partial portions which are connected to each other and are connected to the first plate, situated opposite each other and at a spacing from each other, and/or the second end portion has at least two overlapping end partial portions which are connected to each other and are connected to the second plate, situated opposite each other and at a spacing from each other;
wherein the end partial portions of the first end portion are at least partially integrally connected and at least partially recessed into to the first plate and/or the end partial portions of the second end portion are at least partially integrally connected and at least partially recessed into to the second plate;
wherein the end partial portions of the first and/or of the second end portion respectively have a length between 0.5 cm to 15 cm; and
a second retaining element, which produces at least one of a glued, welded, or sewn connection between the at least two partial portions, wherein the second retaining element has a lower tensile strength than the first retaining element.

18. The apparatus according to claim 17, further comprising an airbag arrangement having at least one airbag flap covering a firing channel, having a visible side orientated towards a vehicle interior, the first end portion being connected like a hinge to the at least one airbag flap and the second end portion being connected to the firing channel or to a support surrounding the airbag flap along one side of the at least one airbag flap.

* * * * *

UNITED STATES PATENT AND TRADEMARK OFFICE
CERTIFICATE OF CORRECTION

PATENT NO. : 8,371,610 B2  Page 1 of 1
APPLICATION NO. : 12/918855
DATED : February 12, 2013
INVENTOR(S) : Kreppold et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 347 days.

Signed and Sealed this
First Day of September, 2015

Michelle K. Lee
*Director of the United States Patent and Trademark Office*